Nov. 27, 1962
T. J. PILLIOD
3,065,508
MITER JOINT CONNECTOR
Filed June 8, 1960
2 Sheets-Sheet 1
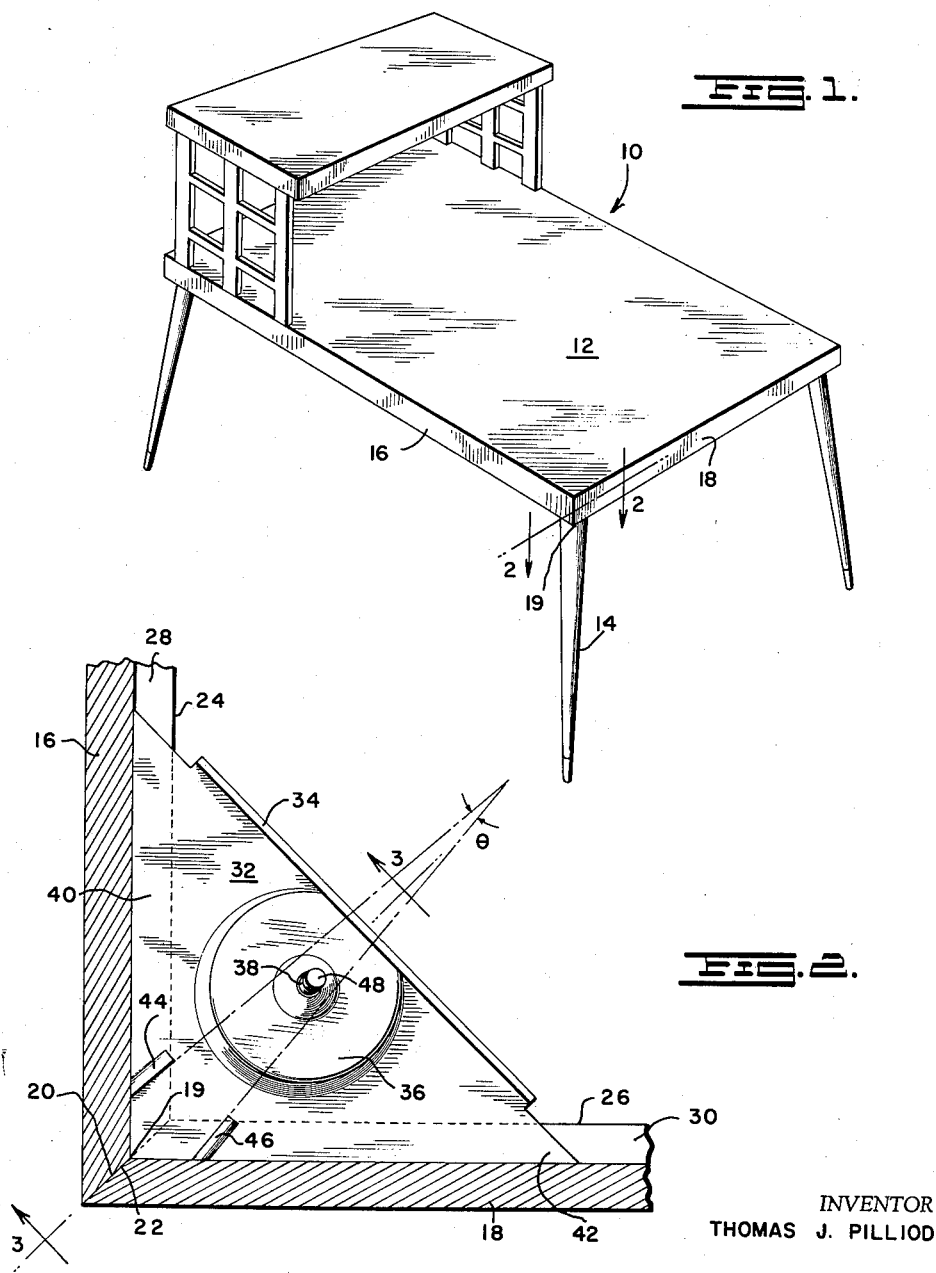
INVENTOR
THOMAS J. PILLIOD
BY Stowell & Stowell
ATTORNEYS

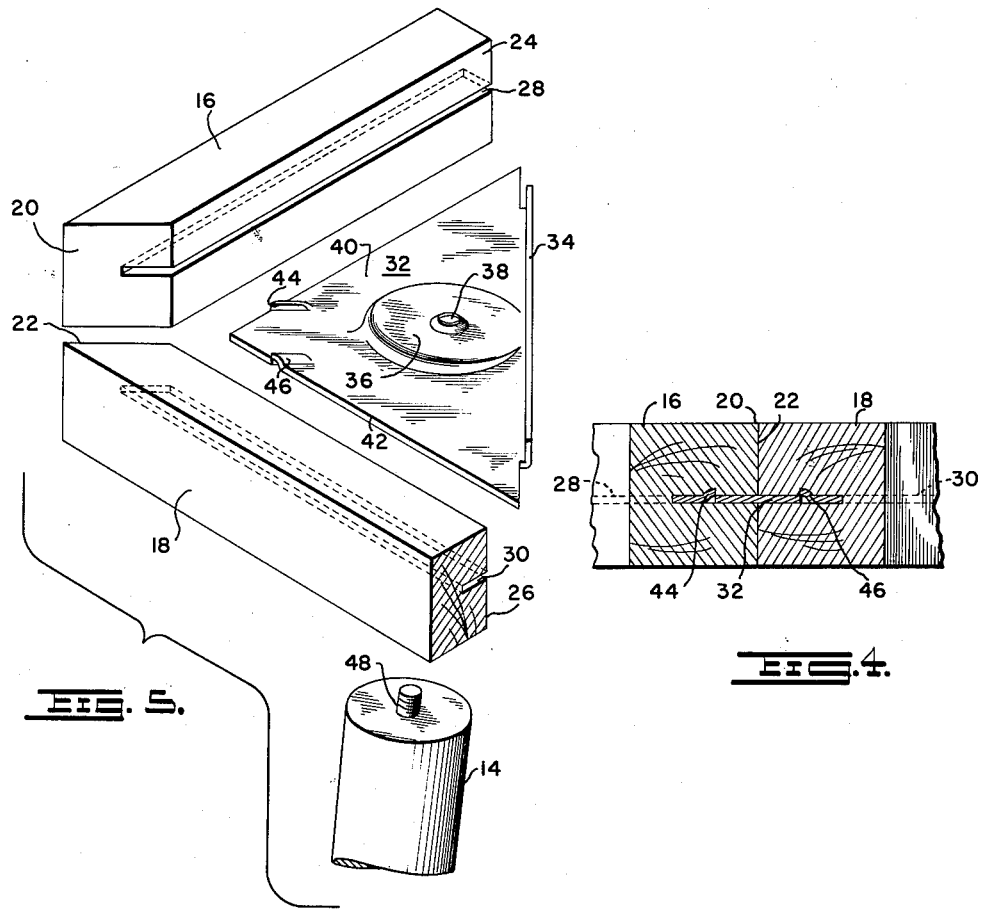
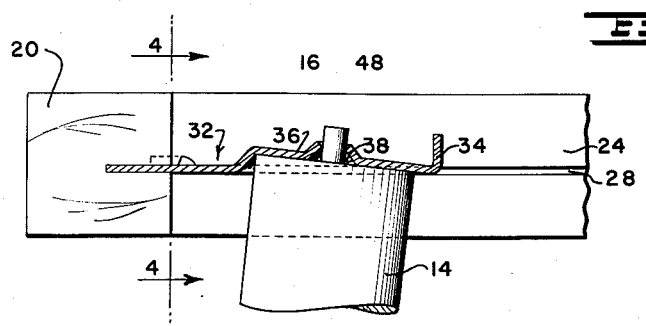

United States Patent Office 3,065,508
Patented Nov. 27, 1962

3,065,508
MITER JOINT CONNECTOR
Thomas J. Pilliod, Swanton, Ohio, assignor to The Pilliod Cabinet Company, Swanton, Ohio, a corporation of Ohio
Filed June 8, 1960, Ser. No. 34,815
1 Claim. (Cl. 20—92)

The invention relates to a miter joint and, more particularly, to a novel connector employed to wedge the pieces forming the joint into snug engagement.

In the conventional miter joints used in forming the corner construction of tables, for example, the mating surfaces of the mitered corners are coated with glue, joined and then drawn snugly together by a clamping nail. A leg supporting block is then glued into the corner to impart greater rigidity to the corner construction and to provide a support for a leg to be attached thereto.

It is an object of the present invention to produce a miter joint connector which upon application to the members to be joined, draws the two miter surfaces together and in its applied position provides a support for a leg.

In one embodiment the invention consists of a connector for forming a miter joint between two bevel-ended pieces, each piece having an open groove on the inner surface thereof in alignment with one another, the connector comprising a generally triangular plate with a thread-engaging aperture formed therein, the triangular plate being of a thickness to fit the grooves of the pieces to be joined when the beveled ends are placed in juxtaposition, and cooperating camming wedges formed in the triangular plate and extending from the region of the marginal edge of the legs of the plate toward the base thereof and projecting outwardly from the plane of the plate.

Other objects and advantages of the invention will become apparent from reading the following detailed description of the invention in conjunction with the attached drawings, in which:

FIG. 1 is a perspective view of a table construction employing the invention,

FIG. 2 is a sectional view of the miter joint connector taken along line 2—2 of FIG. 1, FIG. 3 is a sectional view of the connector taken along line 3—3 of FIG. 2, FIG. 4 is a sectional view of the connector taken along line 4—4 of FIG. 3, and FIG. 5 is an exploded view showing the miter joint connector of the invention and the mitered members and associated leg.

Referring to FIG. 1, there is illustrated a table generally indicated by reference numeral 10 having a top 12, legs 14, and side pieces 16, 18 which are joined together to form a mitered corner 19.

Referring now to FIGS. 2, 3 and 5, it will be noted that the pieces 16 and 18 each are provided with beveled or mitered end surfaces 20, 22, respectively. The mitered end surfaces 20 and 22 are adapted to be joined together to form a miter joint. According to the invention, the inner surfaces 24, 26 of the pieces 16, 18, respectively, are provided with a relatively narrow rectangular slot or groove 28, 30, respectively. The slots 28 and 30 are positioned such that when the mitered end surfaces 20 and 22 are properly joined together in mating relation, the slots are in transverse alignment with one another at the mating surfaces.

The connector 32 of the present is comprised of a metallic plate of generally triangular shape. The base of the plate forming the connector 32 is provided with an upwardly turned flange 34 to provide additional or increased lateral rigidity thereto. Also, the flange 34 provides an extended surface area against which a tool may be applied during the insertion thereof in its operative position.

Substantially centrally located of the connector 32, there is formed, by stamping, for example, an inclined dished and generally circular section 36 having a threaded-engaging aperture 38 formed centrally thereof. The legs 40 and 42 of the connector 32 are each provided with at least one camming wedge 44 and 46, respectively, which is preferably struck upwardly out of the plane of the connector. These camming wedges form an included angle $\theta$ of approximately ten degrees. Although the angle is not particularly critical, the leading edges of the wedges most adjacent the marginal edges of the legs 40 and 42 should be spaced apart from one another a greater extent than the inner or trailing portions. The angular relation is well illustrated in FIG. 2.

It will be appreciated that the slots 28 and 30 are of a thickness approximately equal to the thickness of the metal stock used to form the connector 32, thereby enabling a snug fit therebetween as will be described in greater detail hereinafter.

Although it has been found preferable to fabricate the connector 32 of metal, other materials which are hard, tough, and fracture resistant may likewise be satisfactorily employed.

In operation, when it is desired that the pieces 16 and 18 are to be joined, the respectively mitered surfaces 20 and 22 thereof are coated with glue and placed in abutting relation with their respective slots 28 and 30 in alignment with one another. When so positioned, the connector 32 is applied thereto in such a manner that the apex of the triangular plate is adjacent the corner 19, the leg or edge 40 is adjacent and in alignment with the slot 28 and the leg or edge 42 is adjacent and in alignment with the slot 30. Then, the connector 32 is pressed or otherwise forced into the slots 28 and 30. As the connector is driven inwardly into the slots, the camming wedges 44 and 46 bite into the upper inner surface of their respective slots and due to the fact that the leading portions thereof are spaced farther apart than the other ends thereof, the pieces 16 and 18 are forced together, thereby causing the surfaces 20 and 22 to mate in tightly abutting relation as shown in FIGS. 2 and 4. When the connector 32 is fully driven into the slots 28 and 30, a tight joint is formed between the pieces 16 and 18.

A final step in constructing the finished table, the threaded shank 48 is screwed into the thread-engaging aperture 38 of the connector until the top portion of the leg 14 tightly abuts against the lower surface of the dished section 36.

In certain applications, it may be desirable to apply a glue on the legs 40 and 42 of the connector 32 thereby to further insure a tight positive connection between the connector 32 and the pieces 16 and 18.

Although the connector 32 has been illustrated and described as being planar, it will be understood that satisfactory results could be achieved by a connector wherein the marginal edges of the legs of the connector are in a plane different from the plane of the central portion of the connector. In such an embodiment the slots or grooves formed in the pieces to be joined must be disposed in an angular relation to properly cooperate with the associate leg portions of the connector.

Further, as will be manifest to those skilled in the art, the leg portions of the connector can be formed to assume or include a right angle or alternatively any other desired angle which may be found appropriate.

Also it will be appreciated that although the connector of the present invention has particular application in the construction of tables, similarly, it can be employed in any application where it is a desiratum to construct a miter joint.

In accordance with the provisions of the patent statutes, I have explained the principle and mode of operation of

I claim:

A corner construction for table tops and the like comprising in combination a pair of bevel-ended wooden pieces having a respective end surface of each of said pieces juxtaposed to form a miter corner, each of said pieces having a groove of uniform depth on the inner surface thereof in coplanar relation with the groove in the other of said pieces, and a generally triangular substantially planar connector plate having a pair of leg portions and a base portion, the marginal edges of said leg portions of said plate being seated within the respective grooves of said wooden pieces and engaging the base thereof, said plate having at least one camming wedge stuck out of the plane thereof in each leg portion and extending from the region of the marginal edge of the leg portions toward the base of said plate such that the leading edges of said wedges nearest the marginal edges of the respective leg portion of said plate are spaced farther apart than the respective trailing edges thereof, the angular relationship between said camming wedges being sufficient to cause the respective bevel end surfaces of said pieces to be held in tight juxtaposition to form a miter corner, and means for attaching a supporting leg structure to said plate including a thread engaging aperture formed therein.

References Cited in the file of this patent
UNITED STATES PATENTS

| | | |
|---|---|---|
| 419,375 | Starr | Jan. 14, 1890 |
| 420,724 | Hussey | Feb. 4, 1890 |
| 754,215 | Hayward | Mar. 8, 1904 |
| 2,970,025 | Wilson | Jan. 31, 1961 |